US006678844B2

(12) United States Patent
Vandersteen et al.

(10) Patent No.: US 6,678,844 B2
(45) Date of Patent: Jan. 13, 2004

(54) SYSTEM AND METHOD FOR DETERMINING BIT-ERROR RATES

(75) Inventors: Gerd Vandersteen, Sint-Pieters-Leeuw (BE); Jozef Verbeeck, Geel (BE); Yves Rolain, Halle (BE); Johan Schoukens, Kraainem (BE); Pierre Wambacq, Groot-bijgaarden (BE); Stephane Donnay, Herent (BE)

(73) Assignee: Interuniversitair Microelektronica Centrum (IMEC), Leuven (BE)

( * ) Notice: Subject to any disclaimer, the term of this patent is extended or adjusted under 35 U.S.C. 154(b) by 439 days.

(21) Appl. No.: 09/746,039

(22) Filed: Dec. 22, 2000

(65) Prior Publication Data

US 2001/0044915 A1 Nov. 22, 2001

Related U.S. Application Data

(60) Provisional application No. 60/171,854, filed on Dec. 22, 1999.

(51) Int. Cl.[7] ................................................ G06F 11/00
(52) U.S. Cl. ...................................................... 714/704
(58) Field of Search ................................. 714/704, 705

(56) References Cited

U.S. PATENT DOCUMENTS

| 4,891,812 A | * | 1/1990 | Bocci et al. | ................. | 714/708 |
| 5,768,285 A | * | 6/1998 | Griep et al. | ................. | 714/704 |
| 6,532,087 B1 | * | 3/2003 | Ransford et al. | ........... | 359/110 |

OTHER PUBLICATIONS

Shin et al. (New quqsi–analytical BER estimation technique on the non–linear satellite communication channels), Feb. 1999, IEEE proc. communication, vol. 146, No. 1.*
Bauml, et al., "Reducing the Peak–to–Average Ratio of Multicarrier Modulation by Selected Mapping", Electronic Letters, vol. 22, pp. 2056–2057, Oct. 1996.

Jeruchim, et al., "Simulation of Communication Systems", Plenum Press, New York, 1992.
Muller, et al., "OFDM with Reduced Peak–to–Average Power Ratio by Multiple Signal Representation", Annals of Telecommunications, vol. 52, nos. 1–2, pp. 58–67, Feb. 1997.
Santella, et al., "A Hybrid Analytical Simulation Procedure for Performance Evaluation in M–QAM–OFDM Schemes in Presence of Nonlinear Distortions", IEEE Transactions on Vehicular Technology, vol. 47, No. 1, pp. 142–151, Feb. 1998.
Schoukens, et al., "Parametric and Nonparametric Identification of Linear Systems in the Presence of Nonlinear Distortions—A Frequency Domain Approach", IEEE Transactions on Automatic Control, vol. 43, No. 2, Feb. 1998.
Vandersteen, et al., "A Methodology for Efficient High–Level Dataflow Simulation of Mixed–Signal Front–Ends of Digital Telecom Transceivers", Proc. DAC 2000.

* cited by examiner

Primary Examiner—Albert Decady
Assistant Examiner—Esaw Abraham
(74) Attorney, Agent, or Firm—Knobbe Martens Olson & Bear LLP

(57) ABSTRACT

A method for estimating the BER for telecommunication systems, particular those characterized by signals having high crest factors or causing large inband nonlinear distortions. The set of signals used by the system is divided into subsets according to a characteristic such as signal crest factor, and a BER estimation method is chosen for each subset. Signals causing a large BER are simulated more efficiently using a Monte Carlo simulation, while low BER estimations more efficiently use a quasi-analytical method. The method results in improved accuracy because the noise contribution in quasi-analytical methods can be better approximated for signals having a small crest factor range, and drastically reduces the number of experiments, measurements or simulations which are needed to obtain an accurate BER estimation, as compared to standard Monte Carlo techniques.

18 Claims, 6 Drawing Sheets

SYSTEM AND METHOD FOR DETERMINING BIT-ERROR RATES

The present application claims the benefit under 35 USC §119(e) of copending provisional application No. 60/171,854, filed Dec. 22, 1999. This application is also related to copending U.S. patent application Ser. No. 09/591,026, which is hereby incorporated herein by reference.

FIELD OF THE INVENTION

The present invention relates to the field of data communications, and more particularly to evaluating bit error rates for data communication systems.

BACKGROUND OF THE INVENTION

The bit error rate (BER) of an information transport system is a measure of quality, indicating what percentage of data bits applied as input to the system are correctly retrieved at the output.

The BER of an actual data communication system can be determined by measuring the output of the system for all possible inputs. This requires a large number of measurements of an existing system, yet still may not yield a result which can be generalized over variations of the system. In practice, therefore, the BER is more often predicted from known or presumed characteristics of the system.

In order to predict the BER, a system for which BER is to be estimated is generally modeled using a modeling program such as MATLAB™. MATLAB™ is a general purpose mathematical program, with features for system modeling and simulation, and allows the designer to make various operating assumptions as a basis for any particular set of predictions. A faster simulation program, such as the FAST simulator described in "A Methodology for Efficient High-Level Dataflow Simulation of Mixed-Signal Front-Ends of Digital Telecom Transceivers," by G. Vandersteen, P. Wambacq, Y. Rolain et al., (Proc. DAC 2000), may be used to reduce simulation time. Faster simulation is also taught in U.S. patent application Ser. No. 09/591,026.

Modern communication systems generally use a symbol set for transmitting data electromagnetically, and a BER estimate for a system must be based on the anticipated symbol set which will be used. In a typical Monte Carlo simulation, a symbol will be selected at random and the signal representing that symbol then will be sent through the simulator. (The term "signal" is for some purposes herein used interchangeably with the "symbol" which the signal represents.) The simulated "received data" will be compared with the actual data represented by the symbol. For low BER systems, this will most often show no error. The simulation will then be run repetitively, until a probability of error can be determined (generally requiring that at least one error be observed). This can take a great deal of computing effort.

The above estimation of the probability of error for a given symbol is generally then be done for a large portion of the total symbols used by the system, in order to accurately predict the BER. The lower is the probability of error for a particular symbol, generally the more simulations are necessary to determine the error probability. This method requires extremely large amounts of calculation to accurately determine BER for a complex system having a large symbol set.

Schoukens et al., "Parametric and Nonparametric Identification of Linear Systems in the Presence of Nonlinear Distortions—a Frequency Domain Approach," *IEEE Trans. on Automatic Control,* Vol. 43, No. 2, February 1998 (Reference [1]) demonstrates that the response of a nonlinear system which is excited by a multi-tone (e.g. OFDM) signal can be approximated by a 'best linear approximation', together with an additive noise source. This reference shows that this 'best linear approximation' and the noise source represent the average behavior of the nonlinearity for a particular set of signals.

It is known to use quasi-analytical methods for predicting BER. Jeruchim et al., "Simulation of Communication Systems," Plenum Press, New York, 1992 (Reference [2]) and Santella, et al., "A Hybrid analytical-simulation procedure for performance evaluation in M-QAM-OFDM schemes in presence of nonlinear distortions," *IEEE Transactions on Vehicular Technology* Vol. 47, no. 1, February 1998 pp. 142–151 (Reference [3]) both show such quasi-analytical methods for predicting BER. When applied, as suggested, for the whole set of possible input signals, the bit error rate determined is far from accurate, because the assumption underlying the quasi-analytical method are more violated when the method is applied to a wide range of signals. This is particularly so for BER prediction techniques applied to signals and systems which suffer from clipping. Thus, what is needed is a method which accurately predicts BER, for systems including those which suffer from signal clipping, without imposing the computing burden of Monte Carlo techniques.

Muller et al., "OFDM with Reduced Peak-to-Average Power Ratio by Multiple Signal Representation," *Annals of Telecommunications,* Vol. 52, nos. 1–2, pp. 58–67, February 1997 (Reference [4]) and Bauml et al., "Reducing the Peak-to-Average Ratio of Multicarrier Modulation by Selected Mapping," Electronics Letters, Vol. 22, pp. 2056–2057, October 1996 (Reference [5]) disclose analytical approximation of the probability, within an entire signal set, of signal subsets having common characteristics. In particular, these references disclose approximations of the probability of signal sets distinguished according to the crest factor (CF) of their representative signals. Such analytical approximations are also inaccurate, because again the underlying assumptions are violated for the signals under consideration. Hence, a method to avoid the inaccuracy of known analytical approximation techniques is needed.

SUMMARY OF THE INVENTION

The present invention addresses the above-noted need by applying a combination of Monte Carlo and quasi-analytical techniques to systems. A plurality of subsets of the possible signals which the system will produce are separately evaluated for their contribution to BER, and all of the separate contributions are then appropriately combined. Known analytical approximation techniques are applied only to part of the CF distribution, while a Monte Carlo approach is more appropriately applied for another part of the CF distribution. Signals representing a significant portion of the total signal set of a system (based on its symbol set) are each evaluated. The evaluated signals will be divided into signal subset groups according to relevant characteristics, particularly characteristics which reflect a tendency of the signal to impair the accuracy of quasi-analytical methods. For example, the crest factor (CF) of a signal (the ratio of the peak value of the signal to its rms power value) is a characteristic which is related to a tendency to cause inaccuracies in quasi-analytical BER estimations. A decision is made whether to evaluate the BER contribution of that particular signal by Monte Carlo simulation, or by one of a plurality of quasi-analytical approaches.

For each signal subset, an appropriate method is selected by which to evaluate a BER which the system would have using only signals of that signal subset. In particular, BER for the subset may be determined using Monte Carlo simulations, or by a quasi-analytical approach (or by one of a plurality of quasi-analytical approaches). Then, a representative sample of signals from each subset is selected, and a BER predicted for that signal subset according to the method chosen.

The probability of occurrence of the subset of signals (as compared to the entire signal set) is evaluated. The system BER is predicted by combining the contribution of each signal subset.

DETAILED DESCRIPTION

Figure 1:
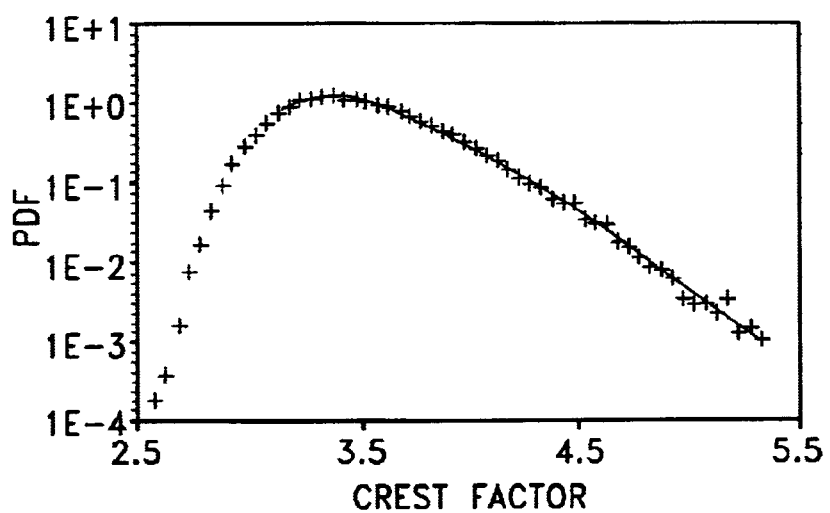
FIG. 1 shows a crest factor distribution of a 16-QAM 256 carrier OFDM signal.

FIG. 1 shows the crest factor (CF) probability density distribution of a 16-QAM 256 carrier OFDM signal, determined with a first kind of Monte Carlo simulation. The solid line represents the probability density function (PDF) of high CF signals in the low-probability tail of the distribution, as estimated by an exponential function which is discussed in more detail below with respect to FIG. 1. The good fit shows that approximation of part of the probability density, certainly for high crest factors, provides acceptable accuracy. Such approximation reduces the amount of Monte Carlo simulations which are needed.

Two kinds of MC simulations used with the present BER prediction system should be distinguished from each other. The first type is a technique for determining a probability density function (PDF) for signals with respect to a categorizing characteristic (e.g. crest factor). In that MC simulation, a characterization sample may be drawn in a random way from the entire signal set used by the communication system, and each signal so drawn may be examined for the value of one or more characteristics, such as crest factor. This MC simulation depends upon the symbol set used by the communication system, which in turn depends on the number of carriers and the modulation type used, but generally does not depend upon the signal processing characteristics of the communication system. At least some of the signals, and their characteristics, which have thus been tested to develop a PDF for the characteristics, are saved and may be used later for estimating BER, either quasi-analytically, or by employing the second type of MC simulation.

The second MC simulation involves determining the BER of a system due to a particular signal by repetitively simulating the system processing the signal (in the presence of stochastic variables such as noise). Enough trials must be run to determine the error rate by simply observing the frequency of simulated errors. This BER MC simulation uses the signals which were identified in the first type of MC simulation as having a particular range of the categorizing characteristic.

The particular signals to be MC simulated for determining BER may be selected at random from those which were identified in the first type of MC simulations as falling within the desired range on the characteristic, thus reusing the results of the first type of MC trials. Moreover, the first MC simulation results may also be reused for quasi-analytical BER estimation. Inband distortion, which is an input to the quasi-analytical process, may be determined during MC simulations of the first type. It may alternatively be measured on signals which have been determined in the first simulations to have a particular range of characteristic (e.g. crest factor).

It is preferred to use, at least partly, a quasi-analytical method for estimating the Bit-Error-Rate (BER) of communications systems. In particular, BER may be estimated even for Orthogonal Frequency Domain Multiplexing (OFDM) modulation schemes suffering from nonlinear distortions somewhere in the transmission path. The present method splits the different transmitted signals into different classes according to a relevant characteristic, such as their crest factor (CF). Signals are preferably segregated into subset which suffer from similar amounts of nonlinear distortion; for example, signals with high CF generally suffer more from such distortions than signals with a low CF, so signals can be segregated into similarly distortion-prone groups on the basis of their CF. Dividing the signals according to their CF makes it possible to select an appropriate BER estimation method. The classes of signals that suffer from a large BER can, e.g., be simulated more efficiently using a Monte Carlo simulation, while low BER estimation can be done more efficiently using a quasi-analytical method. Hence, the overall method requires only a relative small number of experiments or simulations. The method is verified on both simulations and measurements.

Figure 2:
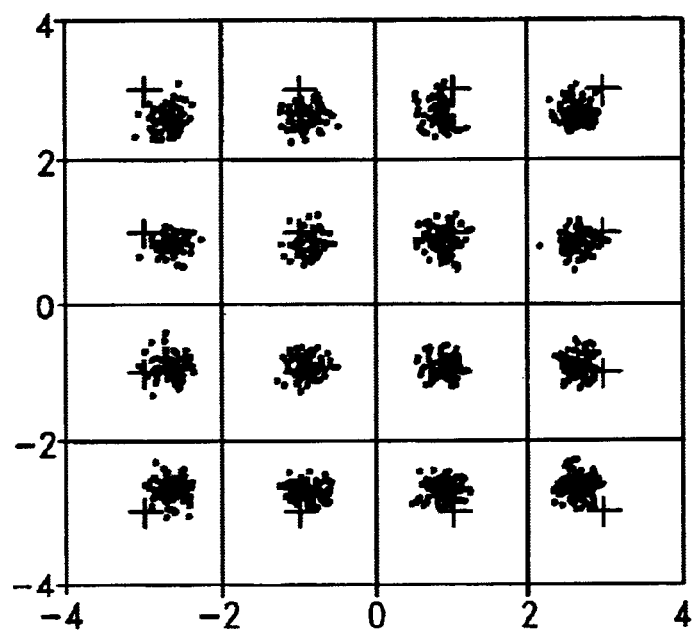
FIG. 2 shows a constellation diagram for a distorted 16-QAM, 256 carrier OFDM signal.

FIG. 2 shows a constellation diagram for a distorted 16-QAM, 256 carrier OFDM signal, where "+" denotes the undistorted 16-QAM constellation diagram. Note the stochastic behavior of the distortion. It is this stochastic behavior, also denoted noise contribution, which is exploited in quasi-analytical methods; and the stochastic behavior is a function of the CF of the signal.

Orthogonal Frequency Domain Multiplexing (OFDM) modulation schemes are widely used in telecommunication systems. Examples are Asymmetric Digital Subscriber Lines (ADSL) modems, wireless Local Area Network (LAN) applications, . . . . These modulations consist out of a sum of N carriers $$x(t) = \sum_{i=1}^{N} a_i(t)\cos(\omega_i t) + b_i(t)\sin(\omega_i t) \quad (1)$$

where all carriers are modulated using a separate modulation scheme such as Phase Shift Keying (PSK), Quadrature Amplitude Modulation (QAM) ... represented by $a_i(t)$, $b_i(t)$. These multisine-like signals can have a large crest factor depending on the transmitted signal. Hence, nonlinear effects in the transmission path—such as clipping—can increase the BER significantly.

The quasi-analytical method for estimating BER is a hybrid method which combines simulations and/or measurement results with an analytical formula. Based on a limited set of experiments and some prior assumptions on the noise, one can calculate the probability of an error analytically. This leads to an important reduction of the measurement or simulation time because one need not wait for actual errors to occur.

A mathematical framework is given below which describes how the BER can be estimated. Thereafter, both the full Monte Carlo and the quasi-analytical method are compared, and the framework is then shown to be valid both in simulations and in measurements suffering different types of nonlinearities.

The OFDM signal can be seen as a multisine with a large number of components. The amplitudes and phases of all carriers are determined by the transmitted signal. Hence, they can be considered as independent realizations of a stochastic process. It is known that the overall response of a large set of nonlinear systems to such multisines can be characterized using a best linear approximation of the transfer function together with a stochastic nonlinear distortion; see Reference [1]. This best linear approximation can be seen as a generalization of the AM/AM and AM/PM compression characteristics used in telecommunication. The stochastic nonlinear distortion can be described as additive noise due to the interaction of the large number of independent amplitudes and phases of the carriers. The level of the nonlinear distortion is a function of the nonlinearity of the complete transmission path, the modulation scheme used (QAM, PSK, etc.), the number of carriers in the OFDM signal, the signal level, and so on.

In a particular application, however, the characteristics of the transmission path, the modulation scheme and the number of carriers is fixed. Also, the average power of the signal will tend to vary far less than the peak power of the signal. Hence, a practical measure to characterize an input signal is its crest factor (CF):

$$CF = \frac{\max|x|}{\text{rms}(x)} \quad (2)$$

The relationship between CF and nonlinear distortion make CF a useful characteristic to use as a basis for categorizing signals into similarly-behaved classes. This permits the use of appropriate BER estimation techniques in order to provide a lower effort (less or no simulations), but still quite accurate, BER determination approach. Consequently, the nonlinear distortion will be studied as function of the crest factor.

Starting from the PDF of the crest factor, the best linear approximation, and the noise level, it is possible to estimate the BER in an efficient way with $$BER = \int_{-\infty}^{\infty} BER(x) \cdot f_{CF}(x) dx \quad (3)$$

BER(x) denotes the BER for a crest factor x while $f_{CF}(x)$ denotes the PDF of the crest factor x. The following practical estimation scheme will be used further.

1. Consider a grid of crest factors $x_1, \ldots, x_M$.
2. Determine the PDF of the crest factor, $f_{CF}(x)$ for $x=x_1, \ldots, x_M$.
3. Determine the inband distortion levels for signals for the complete grid crest factors $x_1, \ldots, x_M$. These can be obtained using either a small number of simulations or measurements with signals having crest factors covering the complete grid $x_1, \ldots, x_M$. If—due to a high BER—it turns out that the BER can be estimated using a Monte Carlo method, then the BER can be obtained in that way.
4. The inband distortion levels are used to compute the $BER(x_1)$ as a function of the crest factor using the standard quasi-analytical method described in References [2] and [3]. One can assume the inband distortion to be Gaussian or quasi-Gaussian.
5. Approximate the total BER with a finite sum over the grid of crest factors $$BER = \sum_{i=1}^{M} BER(x_i) \cdot f_{CF}(x_i) \quad (4)$$

Several studies can be found in the literature which give an approximation of the crest factor distribution. Comparing these theoretical results with simulations shows that their accuracy is low. The main reason for these differences is that the theory makes several assumptions which are violated for practical OFDM signals. They use order statistics to derive the PDF of the crest factor, assuming that the input signal can be described as a set of independent normal (or Rayleigh) distributions. The following assumptions, however, are not satisfied:

1. The signal can only be approximated by a normal distribution. The tails of the distribution—which are very important for the crest factor—are badly approximated by the normal distribution.
2. The samples of an OFDM signal are not a set of independent random variables. Correlation might be introduced by the modulation of $a_i(t)$, $b_i(t)$ of the OFDM signal.

For these reasons, a large number of Monte Carlo simulations are typically used in order to achieve an estimate of the PDF. However, the amount of simulations for determining PDF can be reduced by using analytical approximations of PDF over at least part of the CF range.

In FIG. 1, the crest factor PDF of a 16-QAM 256 carrier OFDM system based on full Monte Carlo simulations is shown. The distribution of the tail of the PDF can readily be extrapolated using an exponential function of the following form, with A, B and C parameters of the communication system modulation scheme (CF=crest factor).

$$A \cdot \exp(B(CF)^C) \quad (5)$$

The coefficients A, B and C can be determined using commercial software to estimate exponentials and require a nonlinear least squares estimate on the logarithm of the PDF. In our experiment we did find that C is close to ½. In this case the nonlinear least squares boils down to a linear least squares.

In section 3 of the estimation scheme, the inband distortion level as a function of the crest factor has to be determined. The inband distortion level correlates to signal crest factor, which makes crest factor a useful basis for selecting signal subgroups for BER calculations. In order to achieve an estimate of the same quality for every crest factor, it is useful to perform a more or less equal number of simulations/experiments per crest factor. This differs from a more traditional approach, where the presence of signals with a certain crest factor is proportional to the probability of the crest factor. Consequently, simulations are not well balanced over all signals, reducing the net accuracy.

Since all dynamic effects can be assumed to be compensated by the adaptive filter in the modem, a static nonlinearity is chosen for simulation purposes which may be represented by an inverse tangent function. This may be represented as follows: Input=A*tan(B*Output)+C=A*(sin (B*Output)/cos(B*Output))+C, or Output=D* inverse tan (E*Input)+F. Parameters for the tangent function are selected by standard curve-fitting techniques such that the simulation predictions accurately match the actual input-output performance of the system. An OFDM signal with N=256 and a 16-QAM baseband modulation is chosen as the default configuration. FIG. 2 shows a typical constellation diagram for this configuration. Note the gain compression, and also note the stochastic behavior as a consequence of the inband nonlinear distortion (no noise is added in the simulation). During the processing of the simulation data a correction with one signal gain factor for the complete constellation diagram is performed in order to compensate for the gain compression. Further, it is assumed that the stochastic behavior of the nonlinear distortion is normally distributed and behaves the same in all cells of the constellation diagram. This makes it possible to characterize the inband nonlinear distortion by one signal RMS value per crest factor, as shown in FIG. 3.

Figure 3:
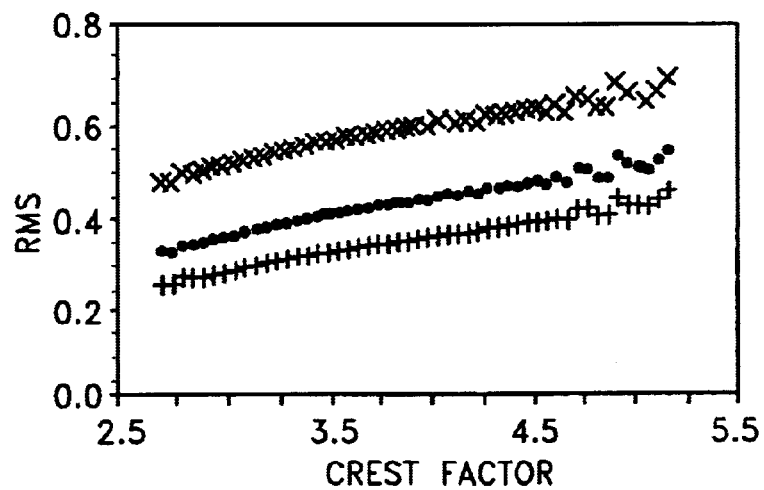
FIG. 3 shows RMS levels of inband nonlinear distortion for a 256 carrier 16-QAM OFDM signal when the system is in 1.5 dB, 2 dB and 3 dB of compression.

FIG. 3 shows the RMS error of the inband nonlinear distortion as a function of the crest factor (0.05 grid) for different compression levels (1.5, 2 and 3 dB). For this type of nonlinearity and modulation scheme, the RMS error increases approximately linearly with the crest factor. Starting from the RMS error, the BER is calculated with the quasi-analytical method as a function of the crest factor. The results from the quasi-analytical method are compared to the actual BER obtained from 25000 Monte Carlo simulations in Table I.

Figure 4:
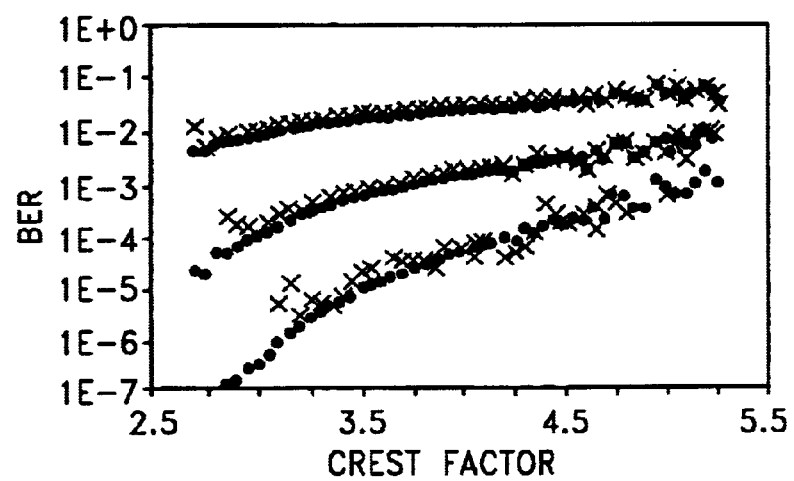
FIG. 4 shows a BER estimation using quasi-analytical versus Monte Carlo simulations.

FIG. 4 shows a BER estimation made by a quasi-analytical method (bullets), as compared to a Monte Carlo (x) simulation for the system in 1.5 dB, 2 dB and 3 dB of compression (from lower to upper curve). The results, with the various crest factors with which the two techniques are used, indicate the desirability of selecting a different technique for determining BER for each crest factor (or crest factor range).

Starting from the results in FIG. 4 and the PDF in FIG. 1, the global BER is calculated with (4). In Table I the calculated BER is compared with the BER achieved with 25000 Monte Carlo simulations (64e5 16-QAM symbols), denoted to be a traditional full MC approach. Note the close correspondence between the simulated and the predicted values, considering that one needs approximately $10^{a+1}$ experiments to determine a BER of $10^{-a}$ within a 95% accuracy of a factor 2.

TABLE I

Comparison of the BER determined using the full Monte Carlo and the quasi-analytical method

| Compression Point | BER using Monte Carlo | BER using quasi-analytical method |
| --- | --- | --- |
| 3 dB | 1.9e-2 | 1.6e-2 |
| 2 dB | 8.0e-4 | 6.5e-4 |

TABLE I-continued

Comparison of the BER determined using the full Monte Carlo and the quasi-analytical method

| Compression Point | BER using Monte Carlo | BER using quasi-analytical method |
| --- | --- | --- |
| 1.5 dB | 2.3e-5 | 2.0e-5 |
| 1 dB | — | 2.7e-8 |

Figure 5:
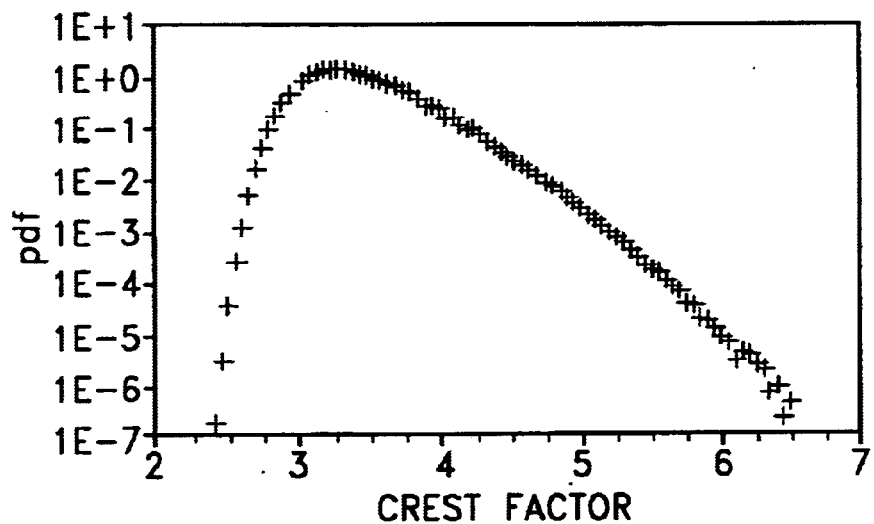
FIG. 5 shows a crest factor distribution of a 256-QAM 222 carrier OFDM signal.

FIG. 5 shows the crest factor distribution of a 256-QAM 222 carrier OFDM signal. For this distribution, an exponential type of approximation is preferably used for signals having a large crest factor and a low probability of occurrence. Detail on this alternative is provided elsewhere herein.

Figure 6:
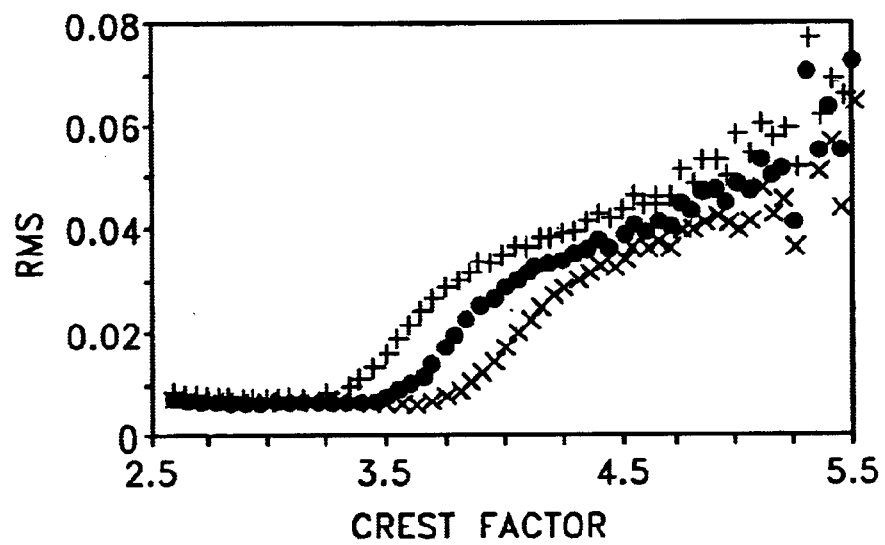
FIG. 6 shows RMS error of nonlinear distortion for a 222 carrier 256-QAM OFDM signal.

FIG. 6 shows the RMS error of the nonlinear distortion for 222 carrier 256-QAM OFDM signal for 3 different clipping levels (3.2, 3.45 and 3.7 times the RMS input voltage, respectively). This figure illustrates that noise contribution varies considerably with crest factor. Accordingly, the use of separate BER determinations for each crest factor (or crest factor ranges) is both feasible and warranted, particularly because these BER determinations are particularly sensitive with respect to the assumed noise contribution.

A second validation is performed on a commercially available power driver of an ADSL modem, which suffers from clipping effects when the crest factor of the transmitted signal becomes too high. An ADSL modem uses an OFDM modulation scheme with 256 carriers using a 1.1 MHz bandwidth which is split up in 3 groups: 4 unused baseband carriers for analog telephone service, 28 carriers for upstream communication, and 222 downstream. A QAM modulation scheme with variable number of bits per carrier is used. The measurements are performed with a fixed 256-QAM modulation in upstream mode (222 carriers between 138 kHz and 1.1 MHz). A best linear approximation, for every clipping level, is determined by conventional techniques and used to compensate for dynamic distortions in the transmission path. Due to the similar modulation scheme, the PDF of the crest factor remains similar (FIG. 5) as in the previous section while the RMS error behaves completely differently due to the previously discussed nonlinearity and the presence of noise during the measurements (FIG. 6). Below a certain crest factor no clipping occurs and the RMS error remains very small. In a first experiment, the BER has been determined using the quasi-analytical method only, but with randomly generated codes.

Figure 7:
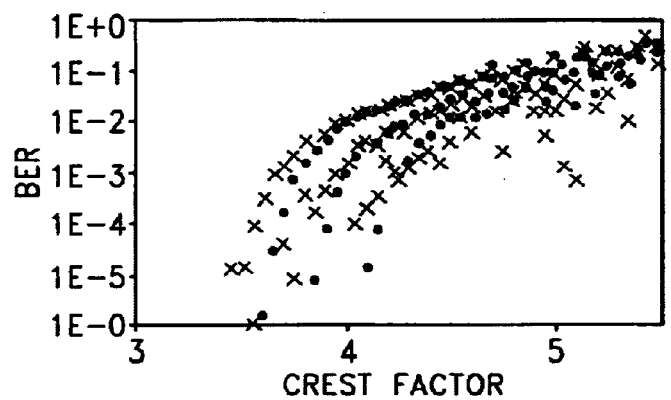
FIG. 7 shows BERs estimated by quasi-analytical versus Monte Carlo techniques for 3 clipping levels.

FIG. 7 shows BER estimated by quasi-analytical techniques (bullets) and by a full Monte Carlo BER estimation after 1.8e5 experiments (X), for 3.9e7 256-QAM codes. The graph is based on randomly generated codes, and compares 3 levels of clipping.

Figure 8:
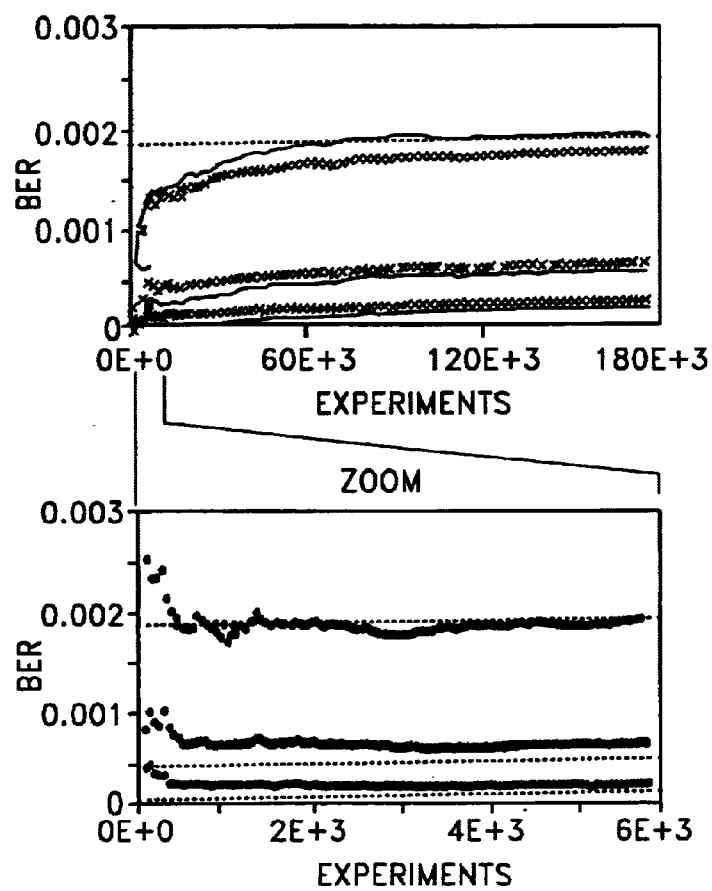
FIG. 8 shows an evolution of estimated BER as function of the number of experiments.

FIG. 8 shows the estimated BER evolving as function of the number of experiments: (–) represents the Monte Carlo BER, (bullet) the quasi-analytical BER starting from selected codes, (X) the quasi-analytical BER starting from randomly generated codes, and (□) the full Monte Carlo BER after 1.8e5 experiments. The upper plot shows the BER as function of all 1.8e5 experiments, while the lower plot zooms in on the first 6e3 experiments. It is seen that about 1e5 experiments are required in order to achieve a quite stable value for the BER with both methods. As a consequence of the large BER, the Monte Carlo method converges almost as fast as the quasi-analytical method. In a second experiment, for every crest factor range an equal number of experiments is performed. The signals which have a CF falling within the specific ranges have been stored during the generation of the PDF of the CF, so no additional time is required to select these signals. It can be seen in FIG. 8 that a stable value for the BER is already achieved after a few thousand experiments. This is 2 orders of magnitude faster than in the previous experiment, which was performed according to the conventional Monte Carlo technique.

In Table II, the global BER of the different methods is compared to each other. Conventional Monte Carlo analysis is labeled "BER full MC." BER QA refers to quasi-analytical estimation of BER. The third column uses random code, i.e. it tests a random selection of signals, while the last column uses codes selected to fall within certain CF ranges, as taught herein, and accordingly uses two orders of magnitude less experiments. Despite the large difference in the number of experiments, both of the quasi-analytical methods perform very similarly.

TABLE II

| Clipping Level | BER full MC 1.8e5 exp. | BER QA 1.8e5 exp. (random code) | BER QA 5.8e3 exp. (selected code) |
| --- | --- | --- | --- |
| 3.2 | 1.9e-3 | 1.7e-3 | 1.8e-3 |
| 3.45 | 4.9e-4 | 5.6e-4 | 5.9e-4 |
| 3.7 | 1.3e-4 | 1.9e-4 | 1.9e-4 |

Allowance is made for the fact that the systematic error is caused by a deviation of the stochastic contribution of the nonlinear inband distortion from a perfect Gaussian distribution. Such a distribution was assumed in the quasi-analytical method in the example above. The use of other distributions, such as quasi-Gaussian distributions, is foreseen also.

Figure 9:
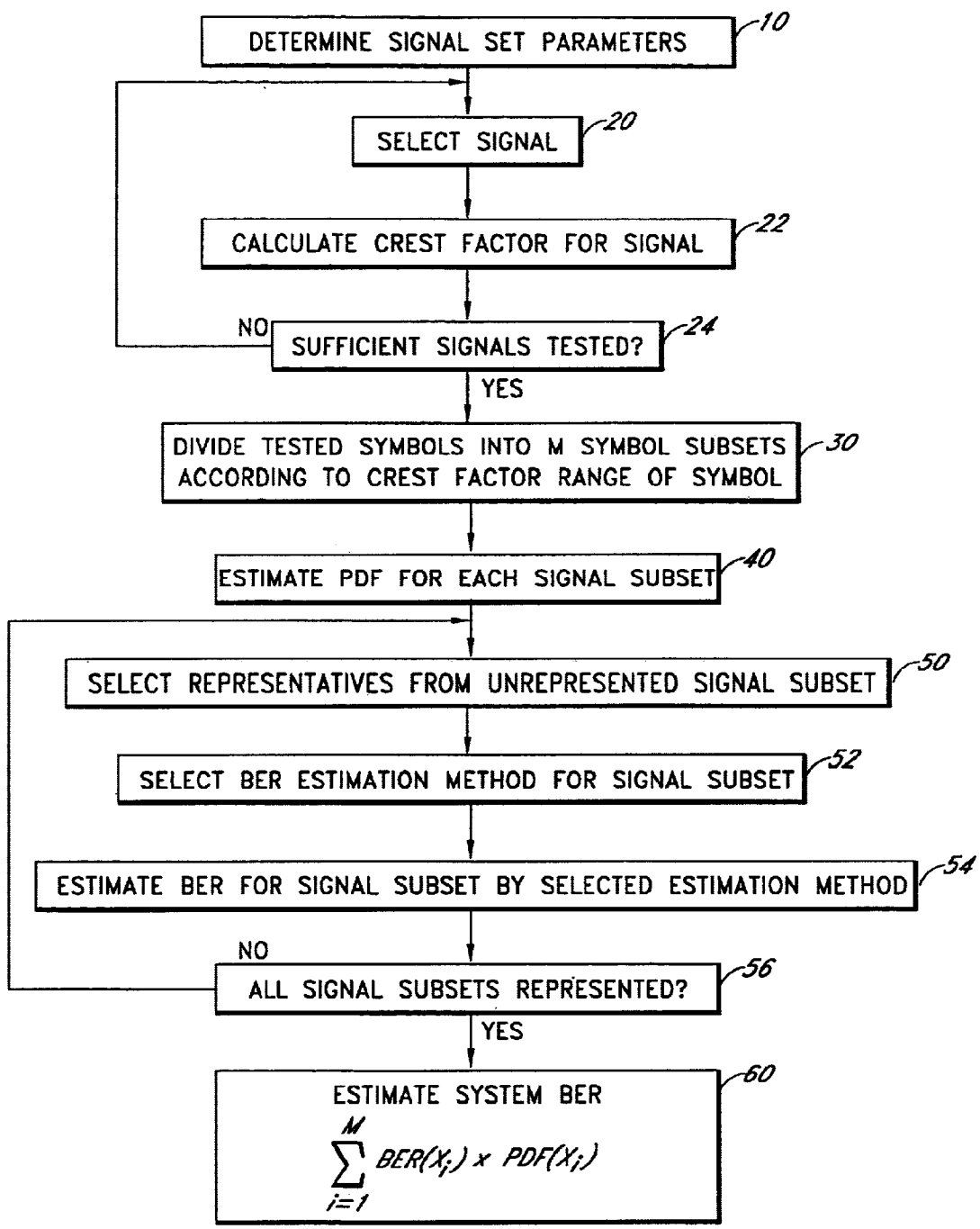
FIG. 9 shows a method or system for estimating BER in a communication system.

The entire system operation is now reviewed and summarized with respect to FIG. 9. The first system block 10 encompasses determining the parameters of the signal set. The signal set is a function of parameters such as the number of carriers and the modulation scheme. The symbol set may, for example, have 52 carriers and use a 64-QAM modulation, resulting in $64^{52}$, or $10^{94}$, possible signals (IEEE Std. 802.11) such as may be used in an Orthogonal Frequency Domain Multiplexing (OFDM) communication system. The signals which represent this entire set may optionally be characterized by examining a characterization sample containing a significant number of the possible signals, such as 50,000,000; the size could be 10,000,000 or less, or 100,000, or as large as the entire signal set. This characterization sample set may be selected at random, or according to any useful criteria, and will be used to make predictions for the entire set of signals. The actual size chosen for the characterization sample is a tradeoff between accuracy and computation effort. Generally, a larger sample permits a higher confidence in the accuracy of the net result.

At block 20, FIG. 9 reflects selecting signals from the entire signal set. These signals may be selected from the entire signal set at random, or may be selected from a subset pre-selected from the entire set (block 10).

Next, a crest factor (CF) is determined for each selected signal (block 22), generally by calculating the actual levels of the signal. CF is the ratio of the maximum of such signal to the rms value of the signal. High CF signals are more likely to cause nonlinear distortion in systems, and accordingly is correlated with higher error rates. Because errors occur more frequently, fewer Monte Carlo trials are generally required to accurately estimate BER for high CF signals than for low CF signals. Also, due to their tendency to exacerbate nonlinear distortions, high CF signals tend to impair the accuracy of quasi-analytical estimates for BER. Accordingly, CF is a good example of a characteristic of signals which is relevant and useful for characterizing the characterization signal set. However, other bases for characterizing the signals are not excluded. For example, inband distortion level is generally determined for each signal subset, and may be used in addition to or in place of CF as a basis for selecting the signal subsets.

At block 24 a determination is made whether sufficient signals have been characterized, for example as to CF. One test for sufficiency is whether the number of signals falling in every range of CF is sufficient to permit accurate estimation of BER therefrom. In an exemplary embodiment of the invention, about 100 signals within each CF range (as defined in block 30) are sufficient. The set of tested signals and their characteristics, such as CF and inband distortion (if tested) is saved, and once the set is deemed sufficient the set of signals which has been tested may be referred to as the characterization signal sample, or characterization signal set.

The range of CF found during the characterization process is determined, and the signals are subdivided into subsets which each represent a subrange of CF (and/or other bases for characterization) (block 30). For example, an entire set of signals may be found to have CF ranging between 2.5 to 5.4, as shown in FIG. 2 for the 52 carrier, 64-QAM OFDM symbol set mentioned above. Quasi-analytical methods for evaluating BER are more accurate when employed with signals having a narrow range of crest factor, or other relevant characteristic, rather than for an entire broad set of signals which may be used by a communications system.

The range may be subdivided into M subranges (block 30). M may be selected for accuracy and convenience; for example, M=40. These subranges may be in uniform CF steps; for example, if M=40 then for 2.5<CF<5.4, the subranges each cover 0.0725 CF; thus the CF subranges are 2.5–2.5725, 2.5725–2.645, 2.645–2.7175, . . . 5.3275–5.4. Alternatively, M can be selected to cover a convenient range of CF. For example, M might be selected such as to create subranges each covering a 0.1 CF range. Finally, it is also appropriate for some purposes to use one or more criteria to create subranges having a non-uniform width. Those skilled in the art will appreciate that the ranges into which the signal set is divided may be varied for different applications or systems, or to trade off estimation speed and accuracy.

The probability density function (PDF) of the tested signal subsets is determined (block 40). The signal subsets are referred to as $x_1-x_M$, and represent signals having CFs falling within the various subgroups 1–M. The PDF estimations for these signal subsets are referred to as $f_{CF}(x_1) \ldots f_{CF}(x_M)$. Though block 40 is shown following block 30 of division into subranges, in practice the functions of the various blocks may be distributed in different orders, and indeed in different blocks. For example, the functions in blocks 24, 30 and 40 may all be performed together so that the number of signals tested (block 24) can be based upon the PDF determined in block 40, and upon finding sufficient signals for each subset (block 30).

The PDF of the crest factor, $f_{CF}$, may be determined in at least two ways. In one, each selected symbol may be simulated to obtain the signal which will represent that symbol, and the signal may be measured for CF. After this has been done for each selected symbol of the characterization symbol set to form a characterization signal set, the proportion of characterization signals falling within each of the M signal subgroups may be extrapolated as an indication of the proportion of signals of the entire signal set which share those characteristics. This is a type of Monte Carlo estimation.

However, it is also possible to estimate the PDF of CF ($f_{CF}$) analytically, which is faster but generally less accurate. For example, the PDF of the crest factor, $f_{CF}$, may be estimated as $$f_{CF} = A \cdot exp(B \cdot (CF)^C) \quad (2)$$

where A, B and C are determined by the modulation scheme and the number of carriers used in the system, and CF is the crest factor.

The basic method for analytically determining the PDF of CF for a full set of signals is known, as explained in references [4] and [5]. However, equation 2 is particularly adapted to extrapolate the PDF of CF for signals in the tail of the distribution, i.e. those having a large crest factor and a small probability of occurrence. The coefficients A, B and C can be determined using commercial software to estimate exponentials, and require a nonlinear least squares estimate on the logarithm of the PDF. In practice, C is typically close to ½, in which case the nonlinear least squares boils down to a linear least squares fitting process.

The analytical method for determining $f_{CF}$, the PDF of the crest factor, may for example be used when the number of signals found to have certain ranges of crest factors is low. Instead of substantially increasing the size of the characterization sample for which CF is measured, one may estimate the probability of crest factors which occur very infrequently. A few signals having a very high CF may have a small but non-negligible effect on the global system BER. Due to their infrequency, even a characterization sample of 50,000,000 may turn up only a few, or even no, examples of such signals. In this event, analytical estimations may give better results than extrapolating from the simulated results from very few samples. $f_{CF}$ may be calculated as indicated. The inband distortion level of signals having the CF range of interest may be assumed Gaussian or quasi-Gaussian, and its value extrapolated from the more well-populated CF ranges. Finally, the BER due to such signals may be estimated quasi-analytically.

Analytical methods for estimating $f_{CF}(x_i)$ to assess BER ($x_i$) (the BER contribution of signals having a particular CF range) are preferred when the size of a CF-range signal subset is below a threshold. The threshold will be chosen by one skilled in the art as a tradeoff between computation accuracy and effort. Such estimation will substantially reduce the amount of computation necessary to yield an acceptably accurate global BER estimate (unless much of the signal set of the communication system at issue has already been previously characterized as to CF). However, if the sample of signals within a particular CF range is above the threshold, then the analytical method is not preferred.

For very extreme signals, an upper bound is found for the contribution to BER by assuming that each such signal causes an error. Thus, the BER contribution from signals $x_i$ having an extreme CF range may be estimated as $f_{CF}(x_i)$ (analytically estimated), multiplied by unity.

For signals $x_i$ in a particular CF range which are not represented by a large enough (about 50 to 100) population of signals after a random characterization sample has been examined, it will be helpful to find more signals in $x_i$. To accomplish this, one may apply methods which are known in the art for selecting signals CF.

However, such methods will be used inversely, in order not to avoid, but to locate and select signals which have a high CF.

Another analytical method for determining the PDF of a set of signals is by using previously established probability information of neighboring sets of signals. For example, if the PDF of the crest factor for signal subsets ($f_{CF}(x_i)$, $f_{CF}(x_{i+2})$) bracketing a signal subset $x_{i+1}$ for which PDF is not known, the PDF of signal subset $x_{i+1}$ may be estimated by linear or other interpolation between the known values.

At block 50, a relatively small number of representative signals from one of the M signal subgroups is selected, for example 100 for each subgroup which forms a representative signal group of 100*M signals (e.g. 4000 representative signals if M=40). In order to achieve an estimate of similar quality for every subgroup, it is useful to perform a more or less equal number of simulations or experiments for each CF range.

These representative signals may be simulated end-to-end through the communication simulator at this stage to determine inband distortion levels. Such distortion will be applied as additive noise in quasi-analytical approaches described below. Inband distortion levels are also a characteristic which may be used in place of crest factor for selecting signal subsets (block 30).

A method is selected to predict a BER which the system would have using only signals from within that subgroup (block 52). The selected method may either be Monte Carlo simulation, or a quasi-analytical estimation. Several such quasi-analytical estimations are known in the art, as are described in References [2] and [3]. While these estimations are prone to inaccuracy when applied to a large range of signals, their accuracy is improved when they are used with signals having a narrow range of CF, and particularly when the CF of the signals is not high.

As the signal CF increases, the assumptions upon which the quasi-analytic methods are premised tend to be more violated, decreasing the accuracy of those methods. However, because the error rate tends to increase for higher CF signals, fewer Monte Carlo trials are required to establish the BER with significant confidence. Depending upon the system, less computing time may be required to determine the BER for high CF signals by Monte Carlo techniques than by quasi-analytical techniques. Above this CF threshold, of course, there is little advantage to using quasi-analytical techniques.

The selected BER estimation technique is then used to estimate a BER for the system under test which is expected if the system uses only signals from the selected subset (block 54). Next, a test is made as to whether BER has been estimated for all M signal subsets (block 56). If not, the process returns and selects additional signal subsets for estimation (block 50). Those skilled in the art will understand that rather than return iteratively through all blocks 50–54, the functions may be performed in a parallel manner. Thus, the functions in block 56 could be included as part of each of blocks 50, 52 and 54 such that representatives from all signal subsets are selected (block 50) before the process begins selecting appropriate BER estimation techniques (block 52); and the BER techniques may be selected for all signal subsets (block 52) before the BER estimation is begun. Then, the BER may be estimated for each signal subset in accordance with the selected technique (block 54). Performing the actions thus in parallel would obviate a need to loop through the blocks as shown in FIG. 9. Moreover, the functions shown in the blocks may be performed in different orders; for example, blocks 52 and 54 may be combined.

The M signal subsets upon which the foregoing operations take place represent $x_1 - x_M$. $x_1 - x_M$, in turn, represent the M groups of signals, out of the full signal set, whose crest factor (CF) is within the range which defines subgroups 1–M. BER estimations BER($x_1$)–BER($x_M$) are calculated for each of these CF signal ranges 1–M (block 56). Finally, the product of each BER (BER($x_i$)) times the PDF of signals in each subrange ($f_{CF}(x_i)$) is calculated, and the contributions from all M subgroups is combined to create an overall system BER estimation (block 60). This can be stated:

$$BER_{System} = \sum_{i=1}^{M} BER(x_i) \times fCF(x_i) \qquad (6)$$

The above-described method can be implemented by an analysis system using a computer or computer environment and executing a program which is capable of capturing specifications of the communication system being examined. Based upon such communication system specification, such analysis system may include modules, corresponding to the blocks shown in FIG. 9, configured for performing the functions of the blocks shown in FIG. 9. Referring to FIG. 9, the analysis system may include:

one or more modules configured to determine the signal set parameters as described above with respect to block 10 of FIG. 9;

one or more modules configured to select signals as described with respect to block 20 of FIG. 9, to group signals into subsets according to their signal properties, and to calculate the CF or other relevant signal properties for grouping the selected signals, either iteratively as suggested by blocks 20, 22 and 24 of FIG. 9, or in another order, such as parallel;

one or more modules configured to derive M signal subsets from the tested signals in accordance with the relevant signal grouping parameter (e.g. CF) as described above with respect to 30;

one or more modules configured to estimate a PDF for signals of the entire signal set sharing selection characteristics which help define the M signal subsets as described above with respect to block 40, including deciding which method or combination of methods to use for such PDF estimation;

one or more modules configured to select representative signals from each of the M signal subsets, to select a BER estimation method based upon the relevant grouping parameter (e.g. crest factor) of the particular signal subset, and to proceed to estimate the BER for the representative signals in each of the M signal subsets, as discussed above with respect to blocks 50, 52, 54 and 59; and one or more modules configured to estimate a BER for the system based upon a combination of the BER contributions for the individual signal subsets, for example by summing the products of BER times PDF for each signal subset.

A description of a system to be considered may be input to a computer appropriately programmed to perform this activity. The computer, under program control, can then calculate the response of the system based on the software description. Alternatively, the Monte Carlo BER determination may be accomplished by measuring on an actual system; such actual measurement requires a signal generating means, which may be incorporated in the system, and also a measuring device. Similarly, the quasi-analytical method may be based on simulations and simulation modules, or alternatively may rely on actual measurements input into the quasi-analytical computation. In the latter case, a measuring device and signal generator are again needed.

Figure 10:
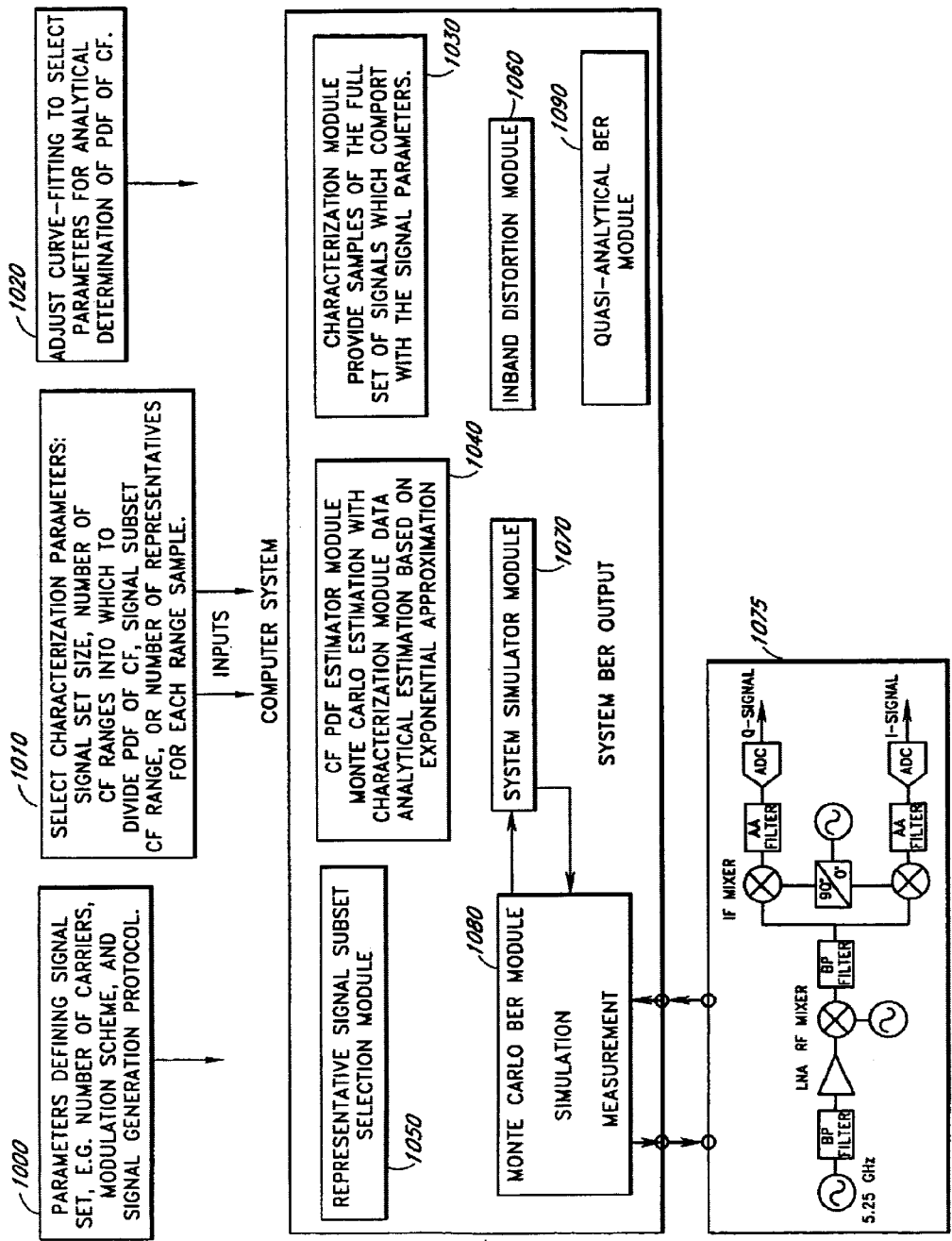
FIG. 10 represesnts a computer system for measuring BER, with operator inputs and test connections showing alternative use of actual communication system measurements.

FIG. 10 shows a computer system for performing BER estimation, along with a representation of inputs to the computer system by the system investigator, and a representation of connecting an actual communication apparatus for measurement of BER performance. The operator will make various inputs. For example, the operator will input the parameters defining the signal set, such as number of carriers and modulation technique (1000). The operator may also input performance criteria, such as the signal characterization sample size, the number of CF ranges to use (or size of the CF subranges), and the size of the representative signals from each signal subset which will be evaluated to estimate BER for each CF range (1010). During the evaluation, the operator may choose to use analytical approximations for CF PDF, and accordingly may enter curve-fitting inputs to adjust coefficients of the analytical PDF estimator (1020). All of this information is entered into a computer system.

The computer system for evaluating BER may have a number of modules to be used alternatively for the estimation. The Characterization Module (1030) provides sample signals according to the input signal parameters, and determines the crest factor or other categorizing characteristic value for each provided signal. These are made available to the crest factor PDF estimator module 1040, which determines the PDF of the crest factor of the characterizing signals. If the operator so dictates, the CF PDF estimator module may use analytic exponential approximation techniques to better estimate the PDF at the tail of the distribution. The Representative Signal Subset Selection Module (1050) saves at least the subset size dictated by the operator, upon which the actual BER measurements will be performed by the Monte Carlo BER Module (1080) or the Quasi-analytical BER Module (1090). A System Simulator Module 1070 may be used for the actual BER estimation performed by 1080 and 1090, or an actual communication apparatus as represented by 1075 may be attached to the computer system for actual evaluation of signals. In this case, signal generation and measurement equipment are needed, or may be included in the communication apparatus 1075. The computer system uses these various modules to obtain a BER estimation and PDF estimation for each subrange of categorizing signal characteristic (e.g. crest factor). These are then summed proportionally to yield the system BER.

What is claimed is:

1. A method for determining a bit error rate (BER) for a communication system conveying a full set of signals, the method comprising:

(a) selecting signal subsets from the full set of signals based upon one or more characteristics of the signals;

(b) determining a BER for the communication system conveying signals of a particular signal subset;

(c) repeating (b) for a multiplicity of particular signal subsets; and (d) combining the BERs determined for the particular signal subsets, wherein (d) comprises, for each particular signal subset for which a BER is determined in (b) and (c):

estimating a probability of occurrence of signals in the full set of signals sharing the selection characteristics of the particular signal subset;

multiplying the determined BER by the probability of occurrence of the respective signal subset characteristics to determine a BER contribution for signals conforming to those of the particular subset; and summing the BER contribution for each particular signal subset.

2. The method for determining BER of claim 1, further comprising:

determining crest factors for signals from the set of signals;

wherein crest factor is a signal characteristic upon which signal subsets are selected in (a).

3. The method for determining BER of claim 1, further comprising determining a probability density function (PDF) for signals, within the full set of signals, which share the characteristics upon which the signal subset selection of (a) is based.

4. The method for determining BER of claim 3, wherein the PDF of signals is determined at least in part by extrapolation from a proportion of signals evaluated by Monte Carlo simulations.

5. The method for determining BER of claim 1, wherein for at least one of said signal subsets of (c), (b) includes estimating BER by Monte Carlo simulation of the communication system conveying representative signals of said at least one signal subset.

6. The method for determining BER of claim 1, wherein for at least one of said signal subsets of (c), (b) includes estimating BEF by quasi-analytical techniques.

7. The method for determining BER of claim 1, further comprising estimating inband nonlinear distortion noise for the signal subsets selected in (a).

8. The method for determining BER of claim 1, wherein crest factor is a signal characteristic upon which signal subsets are selected in (a), the method further comprising:

estimating inband nonlinear distortion noise for the signal subsets selected in (a);

estimating BER for some selected signal subsets using Monte Carlo simulation; and estimating BER for other selected signal subsets using quasi-analytical techniques.

9. A system for determining a bit error rate (BER) of a communication system employing a full set of signals, the system comprising:

a module configured to select a plurality of signal subsets from the full set of signals based upon one or more characteristics of the signals;

a module configured to separately determine a BER for the communication system conveying signals of each selected signal subset;

a module configured to combine the BERs determined for each selected signal subset; and a module configured to determine a probability density function (PDF) for signals, within the full set of signals, which share the characteristics upon which the signal subset selection is based.

10. The system for determining BER of claim 9, further comprising a module configured to determine crest factors for sample signals from the full set of signals, wherein selection of a plurality of signal subsets is based at least in part on crest factors of the signals.

11. The system for determining BER of claim 9, wherein the PDF of signals sharing signal subset selection characteristics is determined at least in part by extrapolation from a proportion of signals evaluated by Monte Carlo simulations.

12. The system for determining BER of claim 9, wherein the PDF of signals sharing signal subset selection characteristics is determined at least in part by interpolation from the PDF of other similar signal subsets.

13. The system for determining BER of claim 9, wherein said module for separately determining a BER for each selected signal subset is configured to estimate BER for at least one of said signal subsets using Monte Carlo simulation of the communication system conveying representative signals of said at least one signal subset.

14. The system for determining BER of claim 9, wherein said module for separately determining a BER for each selected signal subset is configured to estimate BER for at least one of said signal subsets using quasi-analytical techniques.

15. The system for determining BER of claim 14, further comprising a module configured to estimate inband nonlinear distortion noise for at least some of the selected signal subsets.

16. A system for determining a bit error rate (BER) of a communication system employing a full set of signals, the system comprising:

a module configured to select a plurality of signal subsets from the full set of signals based upon one or more characteristics of the signals;

a module configured to separately determine a BER for the communication system conveying signals of each selected signal subset;

a module configured to combine the BERs determined for each selected signal subset;

a module configured to determine crest factors for sample signals from the full set of signals, wherein selection of a plurality of signal subsets is based at least in part on crest factors of the signals; and a module configured to determine a probability density function (PDF) of signals having crest factors within ranges defined for each selected signal subset, the determination being based at least in part upon the proportion of signals within a sample of the full signal set found by simulation to have crest factors falling within the ranges defined for each selected signal subset.

17. The system for determining BER of claim 16, wherein the module configured to separately determine a BER for the communication system conveying signals of each selected signal subset is further configured to estimate BER for at least one of said signal subsets using Monte Carlo simulation of the communication system conveying representative signals of said at least one signal subset, and to estimate BER for at least another of said signal subsets using quasi-analytical techniques employing an estimate of inband nonlinear distortion noise.

18. A method for determining a bit error rate (BER) for a communication system conveying a full set of signals, the method comprising:

selecting signal subsets from the full set of signals based upon one or more characteristics of the signals;

determining a BER for the communication system conveying signals of a particular signal subset;

repeating the determining for a multiplicity of particular signal subsets;

combining the BERs determined for the particular signal subsets; and determining a probability density function (PDF) for signals, within the full set of signals, which share the characteristics upon which the signal subset selection of the selecting is based.

* * * * *

UNITED STATES PATENT AND TRADEMARK OFFICE
CERTIFICATE OF CORRECTION

PATENT NO. : 6,678,844 B2
DATED : January 13, 2004
INVENTOR(S) : Vandersteen et al.

It is certified that error appears in the above-identified patent and that said Letters Patent is hereby corrected as shown below:

<u>Title page</u>,
Item [73], Assignee, please correct to read:
-- Interuniversitair Microelektronica Centrum (IMEC)
   Vrije Universiteit Brussel --

Signed and Sealed this

Sixth Day of July, 2004

JON W. DUDAS
*Acting Director of the United States Patent and Trademark Office*